May 30, 1972  J. HALLER  3,666,456
METHOD OF MAKING COMPOSITE WEAR RESISTANT
ARTICLES, SUCH AS FACE SEALS
Original Filed Aug. 4, 1969   2 Sheets-Sheet 1

INVENTOR
JOHN HALLER
BY Barthel & Bugbee
ATTORNEYS

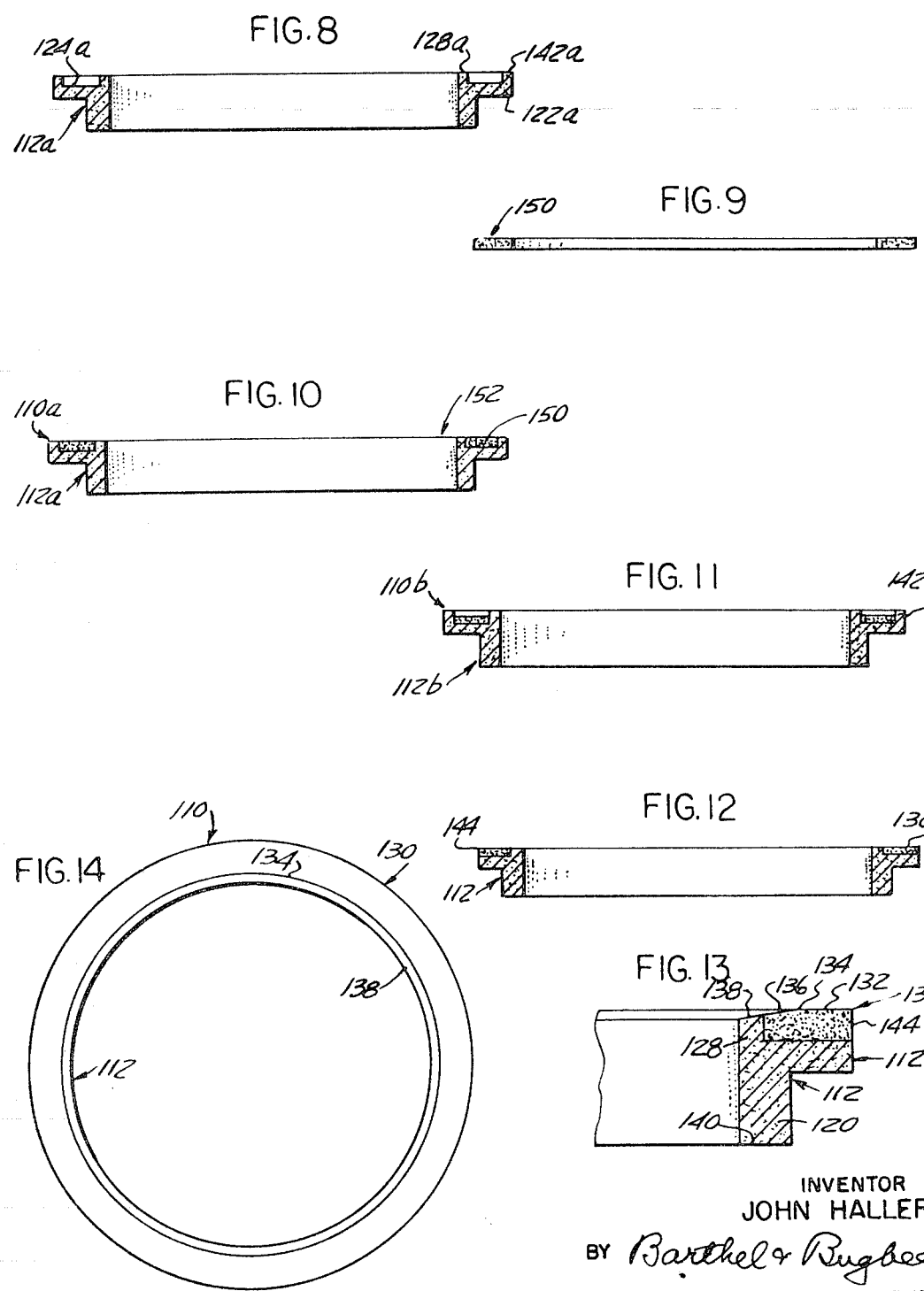

United States Patent Office 3,666,456
Patented May 30, 1972

3,666,456
METHOD OF MAKING COMPOSITE WEAR RESISTANT ARTICLES, SUCH AS FACE SEALS
John Haller, Northville, Mich., assignor to Federal-Mogul Corporation, Southfield, Mich.
Original application Aug. 4, 1969, Ser. No. 847,183, now Patent No. 3,594,011. Divided and this application Sept. 14, 1970, Ser. No. 71,899
Int. Cl. B22f 5/00
U.S. Cl. 75—208                     5 Claims

ABSTRACT OF THE DISCLOSURE

A shallow groove in the flange of an annular radially-flanged briquette of powdered base metal, such as powdered iron, is filled with powder of a wear-resistant metal alloy of high retentive hardness, and this assembly heated to a sufficiently high temperature to simultaneously sinter the base metal briquette and melt the superalloy type powder, which thereupon bonds itself with the iron. The periphery of this composite body is then ground away to expose the superalloy type metal alloy and then finish-machined on its annular face to grind away the edges of the groove and reduce them to the level of the surrounding base metal, a slight inward taper being preferably imparted to the inner part of the hard metal portion.

In a modification, a separate annular briquette of metal alloy powder of wear-resistant high-retentive hardness is prepared in a size adapted to mate with the groove of the base metal briquette and inserted therein. Thereupon the base metal briquette and the hard metal insert are simultaneously heated to sinter the iron powder briquette and melt the hard metal alloy so that it bonds itself to the sintered powdered iron base metal. The resulting annular blank is then machined by grinding as in the principal form of the invention.

This application is a divisional of Ser. No. 847,183 filed Aug. 4, 1969, now Pat. No. 3,594,011.

BACKGROUND OF THE INVENTION

Hitherto, heavy duty face seals and other wear-resistant articles have required the use of super-hard exotic metals of high-retentive hardness for their composition, such as the super-hard alloy of high-retentive hardness of the super-alloy type. Prior to the present invention, these seals from such exotic metal alloys have been required to be cast, as they are too hard to be machined or otherwise formed except by grinding. Moreover, such exotic metal alloys themselves are extremely expensive and the grinding operations required to form them into shaped articles are also time-consuming with a consequently high expenditure of labor and abrasive grinding tools. The "superalloys," particularly some of the iron- and cobalt-based types, have high hardness and show extremely good resistance to the effects of galling and seizing. In many cases their low coefficients of friction allow sliding contact with other metals without damage by metal pickup. Excellent applications of these alloys (because of their antigalling properties) are burnishing rollers, shaft sleeves, and metal-to-metal seal rings. The iron-base alloys of interest in this invention have a lower melting point than cobalt-base or nickel-base alloys, and are more suitable for use. Some of these alloys may be heat-treated to high hardness levels, making them extremely useful in many wear applications.

SUMMARY OF THE INVENTION

The present invention strikingly reduces the cost of heavy-duty face seals or other wear-resistant articles by forming the mounting portion of such face seals by powder metallurgy from inexpensive sintered powdered base metals which require little or no machining and constitute the major part of the seal not exposed to severe wear or heat. An annular portion of powdered super-hard exotic metal of high-retentive hardness is placed in an annular groove formed in a briquette of the base metal. Sintering of the base metal is carried out at a temperature which at the same time melts the exotic metal and bonds it securely to the base metal. The face and periphery of the composite blank thus formed are then ground away to expose the facing of the super-hard metal alloy of high-retentive hardness.

In the drawings:

FIG. 8 is a cross-section through a base metal briquette used in forming the modified composite face seal according to the present invention;

FIG. 9 is a cross-section through a briquette of powdered hard metal alloy formed to fit into the face groove of the briquette of FIG. 8;

FIG. 10 is a cross-section similar to FIG. 8, after the briquette of FIG. 9 has been inserted in the groove of the briquette of FIG. 8;

FIG. 11 is a view similar to FIG. 10, but showing the appearance of the parts after sintering;

FIG. 12 is a view similar to FIG. 11 but showing the appearance of the parts after the periphery and face of the composite sintered powdered metal body has been ground away to fully expose the hard metal alloy portion thereof;

FIG. 13 is an enlarged view of the right-hand end of FIG. 12, again showing the slight taper formed on the inner part of the hard metal alloy portion of the seal during grinding; and FIG. 14 is a top plan view of the composite sintered powdered metal face seal shown in FIGS. 12 and 13.

Figure 6:
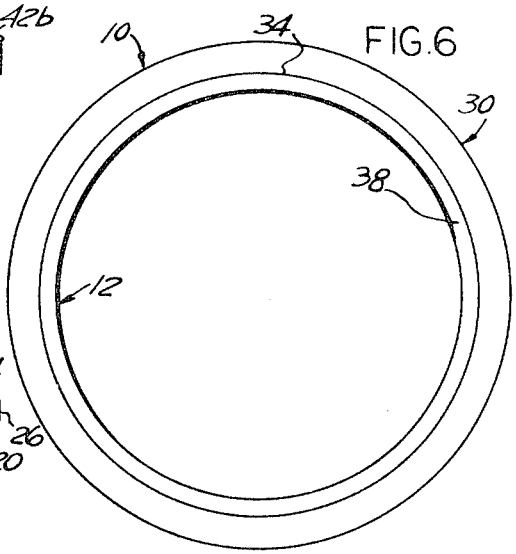
FIG. 6 is a top plan view of the composite sintered powdered metal face seal shown in FIGS. 4 and 5.
Figure 4:
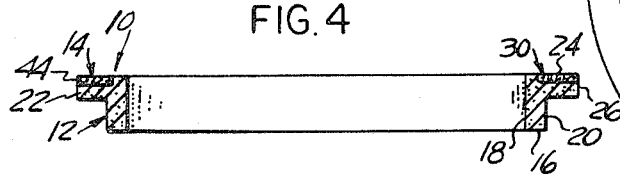
FIG. 4 is a view similar to FIG. 3, but showing the appearance of the parts after the periphery and face of the composite sintered powdered metal body have been ground away to expose the hard metal alloy portion thereof.
Figure 5:
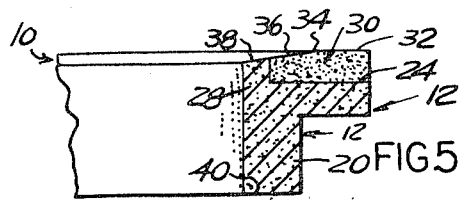
FIG. 5 is an enlarged view of the right-hand end of FIG. 4, showing the slight taper formed on the inner part of the hard metal alloy portion of the seal during grinding.

Referring to the drawings in detail, FIGS. 4, 5 and 6 show a composite heavy-duty face seal, generally designated 10, according to one form of the invention, as consisting of a radially-flanged sintered powdered base metal mounting ring 12 containing an annular face portion 14 of a sintered hard metal alloy of high-retentive hardness or so-called superalloy. The base metal mounting ring 12 consists of a cylindrical portion 16 with a cylindrical bore 18 and a cylindrical outer surface 20 from which a radial flange 22 projects outward from the cylindrical portion 16 and has a recess 24 (FIG. 5) extending out to the periphery 26 thereof and inward to an annular axial portion 28 of the base ring 12. Bonded into the recess 24 in the manner described below is an annular insert 30 of a hard metal alloy of high-retentive hardness, namely an exotic metal such as stellite or the like. The insert 30 has a flat radial outer face surface 32 extending inward to a circular boundary line 34, beyond which an inwardly-tapered surface 36 extends inward across the face 38 of the axial base metal mounting ring portion 28 to the bore 18. The mounting ring 12 has a flat or radial rearward surface 40.

Figure 1:
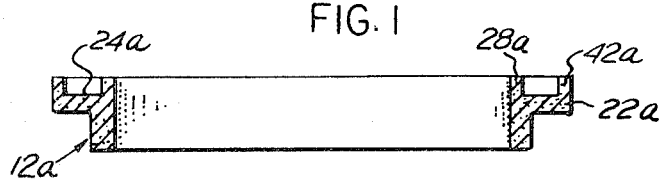
FIG. 1 is a cross-section through a grooved annular powdered base metal briquette used in forming the composite face seal of the present invention.
Figure 2:
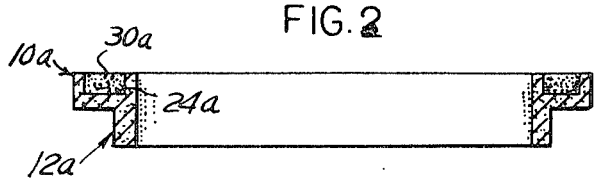
FIG. 2 is a cross-section through the base metal briquette of FIG. 1, after the groove thereof has been filled with hard metal alloy powder of high-retentive hardness.

In producing the composite face seal 10 of the present invention, shown in FIGS. 4, 5 and 6, the operator first prepares an annular flanged briquette 12a (FIG. 1) of base metal powder, such as powdered iron, having a shape corresponding to the mounting ring portion 12 of the final composite face seal 10, but having a groove 24a formed in the flange 22a and having inner and outer side walls 28a and 42a. The briquette 12a is formed in a conventional powdered briquetting press by conventional briquetting methods, well known to those skilled in this art and requiring no elaboration. After the powdered base metal briquette 12a has been prepared in the above manner, its groove 24a is filled with loose powder 30a of a hard metal alloy of high-retentive hardness, such as that alloy known to metallurgists under the name "stellite" to form a powder-filled base metal briquette 12a (FIG. 2).

Figure 7:
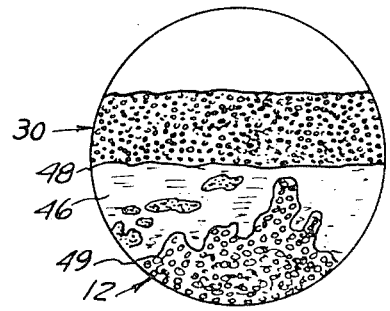
FIG. 7 is a reproduction of a photomicrograph of a section through the rim portion of FIG. 4, magnified 100 diameters, showing the interengagement and interlocking of the bond between the base metal portion and the super-hard alloy portion.
Figure 3:
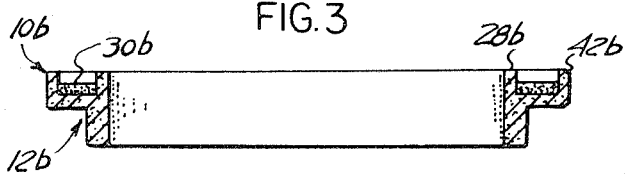
FIG. 3 is a view similar to FIG. 2, but showing the appearance of the parts after sintering.

The thus powder-filled base metal briquette 12a is then transferred to a sintering furnace and sintered at a temperature in the neighborhood of 2150° F. to 2200° F. (for so-called alloy No. 93), sufficiently high to simultaneously sinter the powdered base metal briquette 112a and melt the super-hard powdered metal alloy briquette 150. As a result, the insert briquette 150 melts and its lower surface portion commingles with the base metal at the bottom of the groove 124a (FIG. 11) forming a bonded interlayer similar to that shown at 46 in FIG. 7.

As before, the resulting composite blank 110b (FIG. 11) is then transferred to a conventional grinder which edge-grinds the peripheral shoulder 142b completely away so as to expose the now solid hard metal insert 130b at 144 (FIG. 12). The thus-partially-completed face seal 110b is then face ground to form the flat radial outer face surface 132 (FIG. 13) and subsequently forms the inwardly-tapered or shallow conical surfaces 136 and 138 meeting the annular outer surface 132 at the circular boundary line 134. The result is the composite heavy-duty face seal 110 shown in FIGS. 12, 13 and 14. As before, in connection with FIG. 7, the bonded condition of the super-hard solid metal alloy portion 130 with the base metal portion 112 takes place at an inter-layer similar to the inter-layer 46 of FIG. 7 and the same description of its properties applies as described above in connection with FIG. 7.

In carrying out the above-described process and the modification thereof, the provision of the annular grooves in the faces of the base metal mounting rings retains the molten super-hard metal in position during sintering and prevents it from running off, as well as giving an even thickness of the insert metal.

In the use of the composite heavy-duty face seal of the present invention, as the flat outer peripheral face surface 32 or 132 wears away, it widens in a radial direction, thereby increasing the load-bearing area, as is clearly seen from FIGS. 5 and 13.

I claim:

1. A process of making a composite wear-resistant article, comprising
    forming from powdered ferrous base metal an annular mounting member briquette with a substantially radial face containing an annular recess,
    depositing in said recess a layer of hard super alloy metal powder having a lower melting point than said ferrous base metal,
    effecting melting of said hard super alloy metal powder in said recess by sintering said powdered base member briquette with the hard super alloy metal powder therein at a temperature exceeding the melting point of said hard super alloy metal powder,
    and removing the ferrous base metal in said face at least to the level of the hard super alloy metal in said face.

2. A process, according to claim 1, including the step of also removing the ferrous base metal of the mounting member at the periphery thereof at least as far inward as the hard super alloy metal insert.

3. A process, according to claim 1, wherein the layer of hard super alloy metal powder is deposited in said recess in the form of loose powder.

4. A process, according to claim 1, wherein said layer of hard super alloy metal powder is formed into a briquette configured to fit into said recess, and wherein said hard super alloy metal powder briquette is then deposited in said layer in said recess.

5. A process, according to claim 4, wherein said hard super alloy metal powder briquette is melted down into an annular substantially solid insert in response to sintering said ferrous base metal briquette.

References Cited

UNITED STATES PATENTS

| 1,342,801 | 6/1920 | Gebauer | 29—182.1 |
| 2,096,252 | 10/1937 | Koehring | 29—182.1 |
| 2,518,253 | 8/1950 | Reis | 75—200 |
| 2,817,601 | 12/1957 | Shigley | 75—200 |
| 3,330,630 | 7/1967 | Oakley | 75—200 |
| 3,359,623 | 12/1967 | Gwyn, Jr. | 75—200 |

CARL D. QUARFORTH, Primary Examiner

B. H. HUNT, Assistant Examiner

U.S. Cl. X.R.

29—182.3; 277—96, 224, 235